United States Patent
Wilson et al.

[11] Patent Number: 5,816,292
[45] Date of Patent: Oct. 6, 1998

[54] REVERSE TAPER END PLUG

[75] Inventors: Jeffrey A. Wilson; Gary S. Martin, both of Wilmington; Robert K. Williams, Carolina Beach, all of N.C.

[73] Assignee: General Electric Company, Schenectady, N.Y.

[21] Appl. No.: 638,785

[22] Filed: Apr. 29, 1996

[51] Int. Cl.$^6$ .................................................. F16L 55/10
[52] U.S. Cl. ............................................. 138/89; 138/109
[58] Field of Search ........................... 138/89, 89.1–89.4, 138/96 R, 109

[56] References Cited

U.S. PATENT DOCUMENTS

| | | | |
|---|---|---|---|
| 1,117,669 | 11/1914 | Hall | 138/89 X |
| 1,363,153 | 12/1920 | Murray | 138/89 X |
| 1,491,325 | 4/1924 | Thomas, Jr. | 138/89 X |
| 3,353,565 | 11/1967 | Markham | 138/89 |
| 4,290,543 | 9/1981 | Larson | 138/89 X |
| 4,646,816 | 3/1987 | Rothstein | 138/89 X |
| 5,496,141 | 3/1996 | Popsys | 138/89 X |

*Primary Examiner*—Patrick F. Brinson
*Attorney, Agent, or Firm*—Nixon & Vanderhye P.C.

[57] ABSTRACT

A tube and end plug assembly include a tube having an inner diameter and an outer diameter; an end plug having a tapered body portion with minimum and maximum diameters and a radial flange adjacent the minimum diameter. The tapered body portion is located within an end portion of the tube which is in substantially continuous engagement with the tapered body portion of the plug. A related process of joining an end plug to a hollow tube having a cylindrical end portion, with inside and outside diameters, and wherein the end plug has a body portion with minimum and maximum diameters connected by a tapered surface and a radial flange adjacent the minimum diameter includes the steps of: a) inserting the end plug into the cylindrical end portion of the tube such that the radial flange engages an edge of the cylindrical end portion of the tube; b) deforming the cylindrical end portion of the tube into conformance with the tapered body portion of the end plug; and c) welding the end plug to the tube circumferentially about a joint between the radial flange and the edge.

16 Claims, 1 Drawing Sheet

REVERSE TAPER END PLUG

TECHNICAL FIELD

This invention relates to boiling water nuclear reactors and, specifically, to a new end plug for a neutron absorber tube of a control rod assembly.

BACKGROUND

The current design for neutron absorber tube sealing requires that the tube end be swaged to smaller diameter to allow for weld crown clearance, and to create a press fit for the regularly tapered end plug, i.e., a taper in which the diameter decreases in a direction away from the radial end flange of the plug. The press fit creates a contact interface at the body of the plug adjacent the end plug flange. This interface controls the welding quality via the thermal conduction path (heat sink) to the end plug which has greater mass than the tube wall. Normal manufacturing variations in tube wall thickness, outside and inside diameter, and end plug body dimensions, however, produce variable interfacial contact length. As this cannot be detected in the plugged tube assembly, the welding parameters cannot be varied to accommodate this variation in the heat sink. This often results in lack of penetration, porosity, or root side underfill in the closure weld. Weld quality yields vary between 30%–100%.

To prevent low yields, painstaking measurements must be taken on each tube to ensure that the resulting swage press fit will produce a quality weld. In addition, the current swaging process causes short die life and frequent shim set up adjustment due to the point contact on the die required to meet the current swage dimensions.

SUMMARY OF THE INVENTION

The above problems are eliminated by this invention which uses an end plug with a reverse taper, i.e., the plug body is larger near its free end than at the end plug radial flange. In use, the reverse taper end plug is inserted in the tube end to be sealed. The tube and end plug are then pushed into a rotary hammer swager. The dies in the hammer swager are equipped with a spring loaded plunger to hold the end plug firmly against the end of the tube. The rotary hammer swager revolves around the tube while simultaneously striking the tube from both sides. The die profiles are angled such that the tube wall is closed around the reversely tapered body of the end plug. As the tube diameter is reduced, the reverse taper forces the end plug to be drawn into place until the flange seats firmly against the tubing face. The joint formed by the tube and end plug flange are then circumferentially welded to seal the tube end.

The reverse taper end plug allows each tube and end plug to be custom swaged regardless of the variation of tubing or end plug dimensions. This design also generates an invariable interfacial contact length that is always the length of the end plug body. This allows more welding heat to be applied to avoid porosity and lack of penetration without creating root side underfill. In addition, the reverse taper process eliminates the need for an internal mandrel, which suffers wear and causes tube scrap. To cover the range of part sizes, the current process requires three different mandrels and two die sets. The reverse taper process in accordance with this invention only requires two die sets with a common spring plunger. In addition, the reverse end plug serves as an inner mandrel for the tube during swaging.

In its broader aspects, therefore, the invention relates to a tube and end plug assembly comprising a tube having a specified inner diameter and an outer diameter; an end plug comprising a tapered body portion having minimum and maximum diameters and a radial flange adjacent the minimum diameter; wherein the tapered body portion is located within one end portion of the tube, the one end portion of the tube being in substantially continuous engagement with the tapered body portion of the plug.

In still another aspect, the invention relates to a process of joining an end plug to a hollow tube having a cylindrical end portion, with inside and outside diameters; the end plug having a tapered body portion having minimum and maximum diameters and a radial flange adjacent the minimum diameter comprising:

a) inserting the end plug into the cylindrical end portion of the tube such that the radial flange engages an edge of the cylindrical end portion of the tube;

b) deforming the cylindrical end portion of the tube into conformance with the tapered body portion of the end plug; and c) welding the end plug to the tube circumferentially about a joint between the radial flange and the edge.

Other objects and advantages of the invention will become apparent from the detailed description which follows.

BEST MODE FOR CARRYING OUT THE INVENTION

Figure 1:
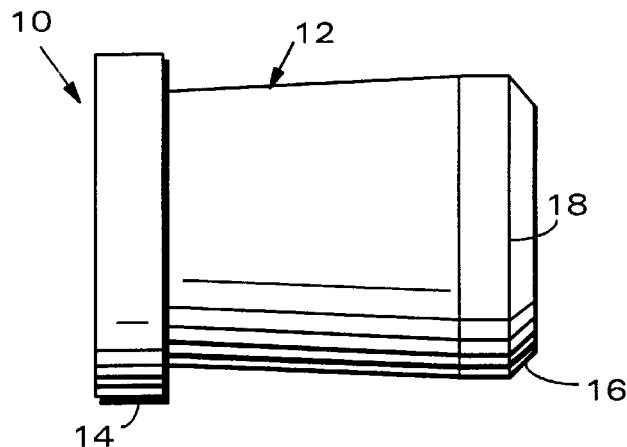
FIG. 1 is a side elevation of an end plug in accordance with the invention.

With reference to FIG. 1, the end plug 10 includes a body portion 12 of circular cross-sectional shape, with a radial flange 14 at one end thereof. The body portion tapers outwardly in a direction away from the radial flange 14 from a first diameter of from about 0.126 to about 0.167 inch to a second or maximum diameter of from about 0.135 to about 0.177 inch adjacent a free end remote from the flange 14. The free end is beveled at 16, and the maximum body diameter is thus at the annular flat 18 lying between the beveled end 16 and the outwardly tapering body portion 12. The flange diameter may be about 0.170 to about 0.202 inch, with a flange thickness of about 0.035 inch. The plug length may be about 0.188 inch, and the flat 18 may have an axial length of about 0.030 inch.

It should be understood that the above end plug dimensions are intended for application with a range of tube sizes, but these dimensions may vary if the end plug is used with tubes outside that range.

The plug 10 is preferably of a solid ER308L Stainless material, but other alloy compositions may be suitable.

Figure 2:
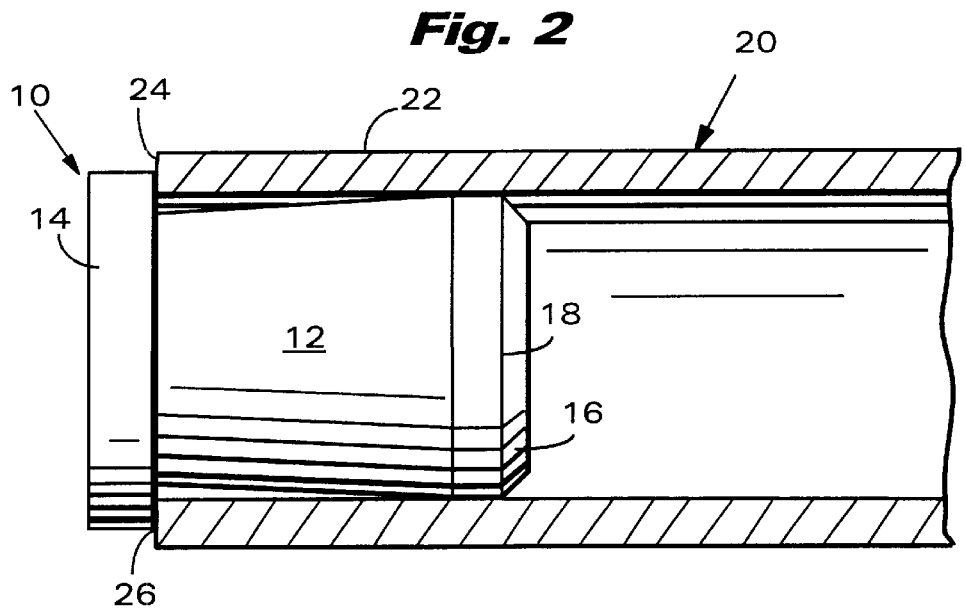
FIG. 2 is a side elevation, partly in section, of the end plug of FIG. 1 inserted into an open end of a tube.

Turning now to FIG. 2, the end plug 10 is shown assembled to a tube 20 which, in the exemplary embodiment, is the neutron moderator component of a reactor control rod.

Initially, the plug 10 is inserted into an open end of the tube 20 to be sealed. During initial insertion, there is a clearance of about 0.003 inch between the tube interior and the end plug flat 18.

Figure 3:
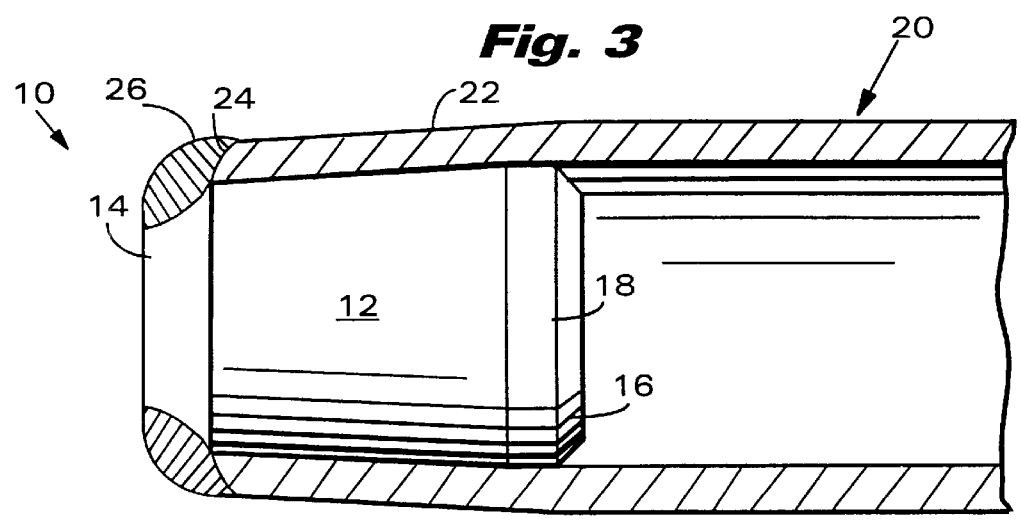
FIG. 3 is a side elevation, partly in section, of the end plug and tube of FIG. 2, but with the tube end deformed into conformance with the end plug.

After insertion, the assembled tube 20 and plug 10 are introduced (i.e., pushed axially) into a conventional rotary hammer swager (not shown). The swager, if not already equipped to do so, is modified to apply an axial force to the plug flange 14, typically via a spring loaded plunger, so as to maintain the plug 10 in position relative to the tube 20 during introduction into the swager. The plunger may also serve as a stop, limiting axial insertion of the tube/plug assembly into the swager. In conventional fashion, the swager revolves about the tube as the hammer elements strike the tube 20 from opposite sides, in opposite radial directions. The hammer or die elements are shaped to close the tube wall portion 22 about the tapered body 12 of the plug 10 as best seen in FIG. 3. It will be appreciated that as the diameter of tube portion 22 is reduced, and as it conforms to the taper of plug body portion 12, the end plug will be drawn axially into place, such that the flange 14 seats firmly against the edge 24 of the tube. Once the swaging operation is completed, the plug 10 is welded to the tube at the circumferential joint indicated by weld 26. The flange 14 serves as filler material for the weld, and the final configuration is shown in FIG. 3.

Because the tube end now has a reduced diameter, there is more than enough space to accommodate the circumferential weld, i.e., the weld diameter does not exceed the maximum OD of the unswaged portion of the tube. This is important because in a typical installation, 15 to 21 such tubes are located within a sheath and if the weld material protrudes beyond the maximum tube OD, undesirable lateral forces will be exerted on the tubes.

The above described process also provides a consistent tube-to-plug interface and similarly consistent closure weld quality, regardless of slight variations in tube and/or end plug dimensions. In addition, the tube-to-tube connection in accordance with this invention generates an invariable interface contact length that is always equal to substantially the length of the plug body portion 12. An added benefit is that the mechanical interlock resulting from the reverse taper configuration of the plug prevents the plug 10 from separation vis-a-vis the tube during pre-weld handling.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tube and end plug assembly comprising a tube having a specified inner diameter and an outer diameter; an end plug inserted into one end of the tube, said end plug comprising a tapered body portion having minimum and maximum diameters wherein the minimum diameter lies adjacent an edge of the tube; wherein the tapered body portion is located within one end portion of the tube, said one end portion of said tube being in substantially continuous engagement with said tapered body portion of said plug from said minimum diameter adjacent said edge to said maximum diameter.

2. The assembly of claim 1 wherein said tapered body portion has a beveled edge adjacent said maximum diameter.

3. The assembly of claim 2 wherein said tapered body portion extends outwardly toward said maximum diameter, where a circumferential flat connects the tapered body portion to the beveled edge.

4. The assembly of claim 1 including a circumferential weld about an interface between said edge of said tube and said end plug.

5. The assembly of claim 1 wherein said end plug is constructed of ER308L Stainless.

6. The assembly of claim 1 wherein said maximum diameter of said tapered body portion is between about 0.135 and about 0.177 inch.

7. The assembly of claim 6 wherein said end plug has an overall length of about 0.188 inch.

8. The assembly of claim 3 wherein said circumferential flat has an axial length of about 0.035 inch.

9. The assembly of claim 4 wherein the circumferential weld has a diameter no greater than a maximum diameter of said tube.

10. A tube and end plug assembly comprising a tube having a specified inner diameter and an outer diameter; an end plug inserted into one end of the tube, said end plug comprising a tapered body portion having minimum and maximum diameters wherein the minimum diameter is closest to said one end of the tube; wherein the tapered body portion is located within one end portion of the tube, said one end portion of said tube being in substantially continuous engagement with said tapered body portion of said plug and wherein a circumferential weld is provided about an interface between an edge of said tube and said end plug.

11. The assembly of claim 10 wherein said tapered body portion has a beveled edge adjacent said maximum diameter.

12. The assembly of claim 11 wherein said tapered body portion extends outwardly toward said maximum diameter, where a circumferential flat connects the tapered body portion to the beveled edge.

13. The assembly of claim 10 wherein said end plug is constructed of ER308L Stainless.

14. The assembly of claim 10 wherein said maximum diameter of said tapered body portion is between about 0.135 and about 0.177 inch.

15. The assembly of claim 14 wherein said end plug has an overall length of about 0.188 inch.

16. The assembly of claim 15 wherein said circumferential flat has an axial length of about 0.035 inch.

* * * * *